UNITED STATES PATENT OFFICE.

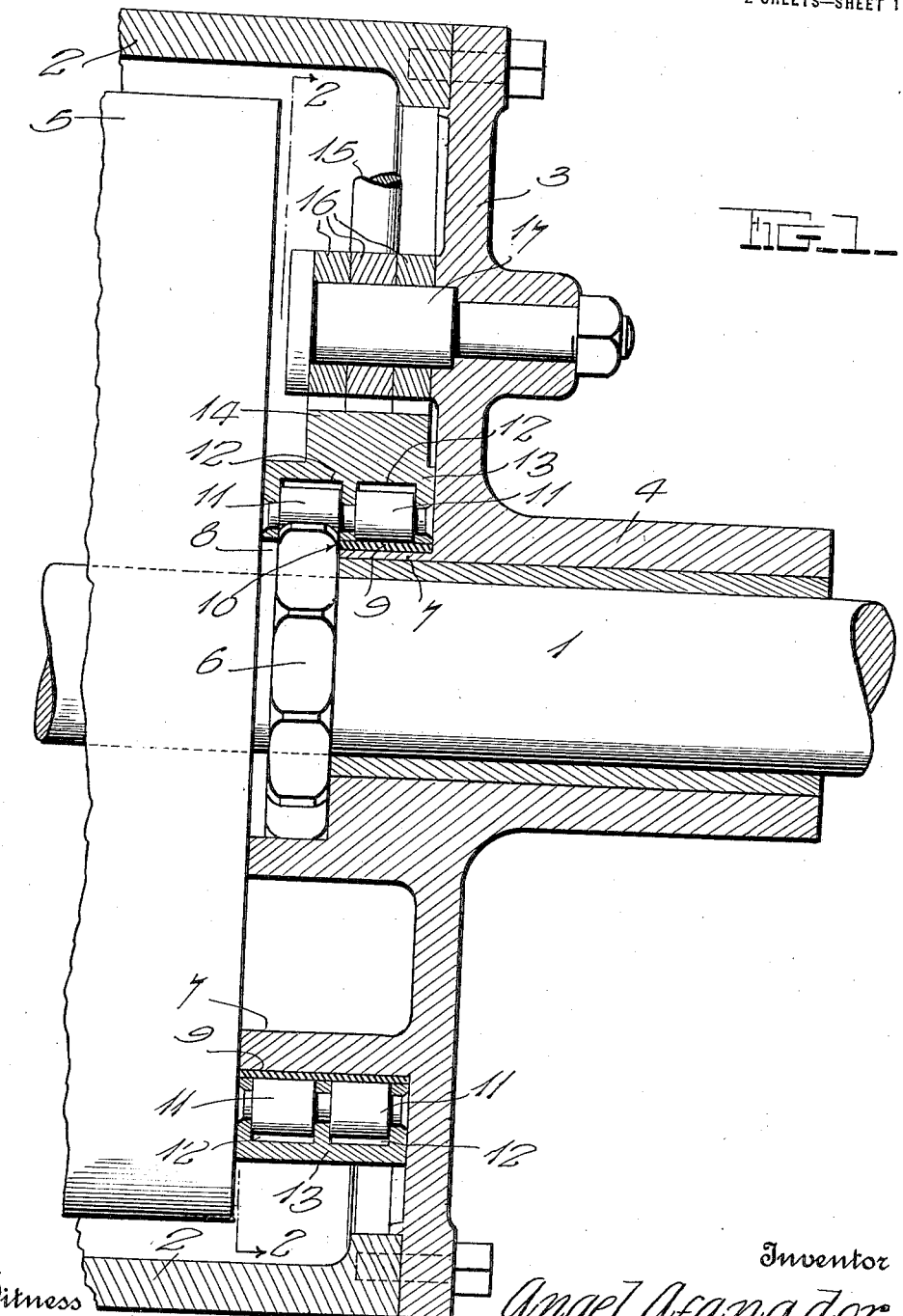

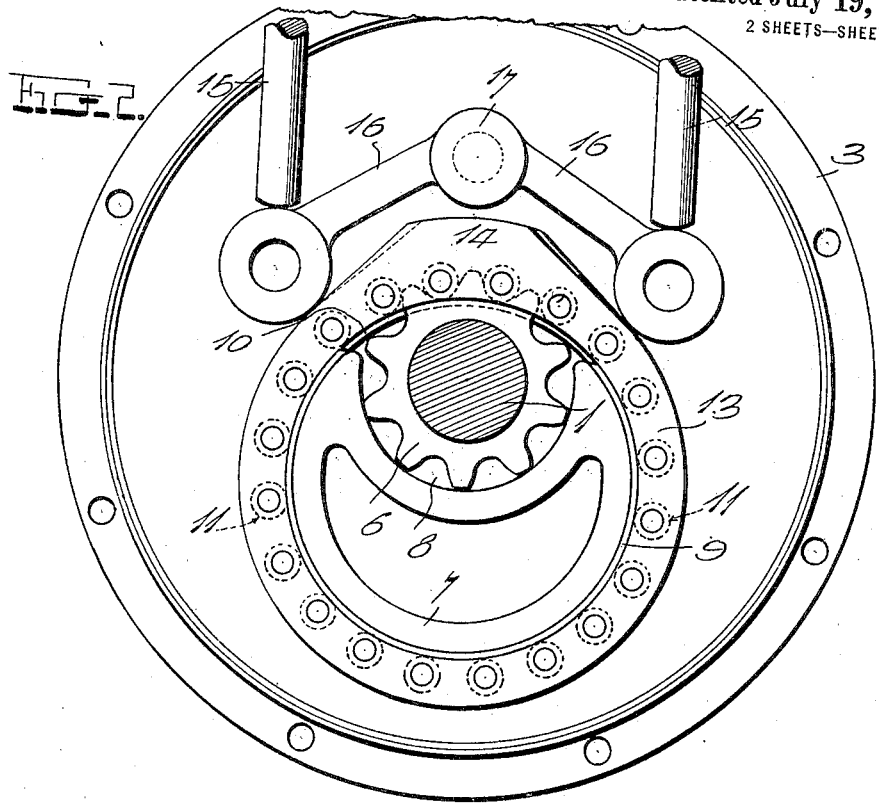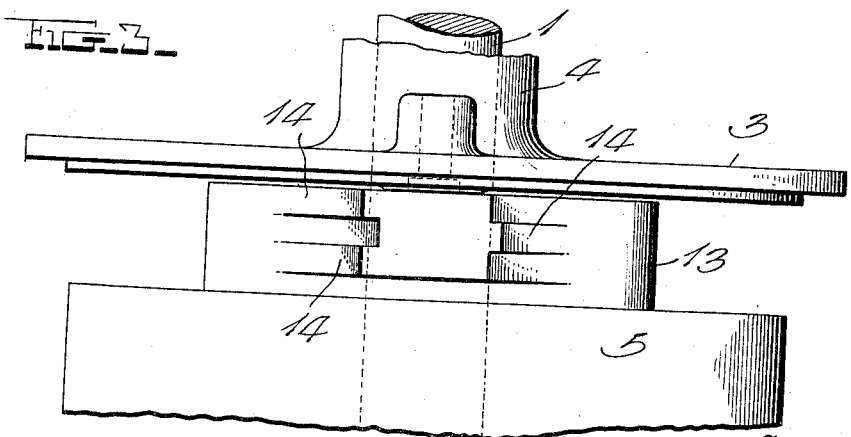

ANGEL AFANADOR, OF LINCOLN, NEBRASKA.

VALVE-GEAR FOR MOTORS.

1,385,104.

Specification of Letters Patent. Patented July 19, 1921.

Application filed June 12, 1919. Serial No. 303,581.

*To all whom it may concern:*

Be it known that I, ANGEL AFANADOR, a citizen of the United States, residing at Lincoln, in the county of Lancaster and State of Nebraska, have invented certain new and useful Improvements in Valve-Gears for Motors; and I do declare the following to be a full, clear, and exact description of the invention, such as will enable others skilled in the art to which it appertains to make and use the same.

My invention relates to improvements in operating means for the valves of motors such as those commonly used on motor cycles, and the object of the invention is to provide a novel construction and arrangement of parts which will eliminate the use of cam shafts and gears, and which will be more simple and compact than the valve operating mechanisms now commonly used.

With the foregoing in view, the invention resides in the novel valve operating mechanism hereinafter fully described and claimed, reference being made to the accompanying drawings.

Figure 1 is a vertical transverse section of one side of a motor cycle crank case and the invention associated therewith.

Fig. 2 is a sectional view on substantially the plane of line 2—2 of Fig. 1, showing more particularly the floating ring which carries the cams, and the means for driving said ring.

Fig. 3 is a partial top plan view with the push rods and rockers removed.

In the drawings above briefly described, the numeral 1 designates the crank shaft of a gasolene or other motor such as those used on motor cycles; 2 has reference to the crank case, and 3 refers to a removable side plate of said crank case which is provided with a central bearing 4 for the shaft 1. One of the fly wheels 5 is shown spaced inwardly from the side plate 3 and a sprocket 6 is secured on the shaft 1 adjacent the outer side of said fly wheel.

An annular track 7 is formed integrally with or otherwise carried by the inner side of the plate 3 and is eccentrically located with respect to the shaft 1, to such an extent as to allow only the teeth of the sprocket 6 to extend beyond the periphery of the track, a suitable notch 8 being provided in the inner edge portion of the track to receive said sprocket. A hardened bearing sleeve 9 preferably surrounds the track 7 and is provided with a notch 10 registering with the notch 8, and upon this sleeve, annular sets of rollers 11 travel, said rollers forming the teeth of a floating internal gear ring 13 which carries cams 14 for operating the valves, said ring having grooves 12 in which the rollers are mounted. The sprocket 6 meshes with the rollers of one of said annular sets and the ratio is such as to drive the ring at half the speed of the crank shaft, thereby obtaining the result now requiring the use of cam shafts and reducing gears, and at the same time providing a more simple and compact structure, and one which will be practically noiseless. One series of the rollers travels constantly on the track and with the exception of their travel across the notch 8, the other series also runs upon said track continuously. The ring 13 is thereby effectively guided in its rotation and will at all times remain in proper position for operating the valves.

The cams 14 might in some instances contact directly with the lower ends of the valve operating push rods 15, but in most cases I prefer to interpose rockers 16 between said cams and push rods, said rockers being mounted on a suitable pin 17 carried by the side plate 3 of the crank case.

I have shown and described my invention in connection with a motor vehicle motor and have mounted the several parts upon one side plate of the crank case, and although I intend principally to use the device in this relation, it is to be understood that it is adaptable to numerous other forms of motors and that it could be mounted in any suitable manner, other than as shown. In all cases however the device is simple, efficient and practically noiseless, and is less expensive than the usual mechanisms now employed; and since probably the best results may be obtained from the details disclosed, they may well be followed, but I wish it understood that within the scope of the invention as claimed, numerous minor changes may well be made.

I claim:

1. In a valve gear for internal combustion engines, the combination with a crank case having a removable end, a crank shaft passing across said crank case and through said end, and valve-operating rods extending into said crank case; of a fixed annular track within the crank case and carried by the inner side of said removable case end, said track surrounding said shaft eccentrically, an internal gear ring within said crank case and surrounding said track in running contact with the latter, a gear on said crank shaft within said crank case and meshing with said internal gear ring, and cams on said gear ring for actuating said valve-operating rods.

2. In a valve gear for internal combustion engines, the combination with a crank case having a removable end, a crank shaft passing across said crank case and through said end, and valve-operating rods extending into said crank case; of a fixed annular track within the crank case and carried by the inner side of said removable case end, said track surrounding said shaft eccentrically, an internal ring within said crank case and surrounding said track in running contact with the latter, a gear on said crank shaft within said crank case and meshing with said internal gear ring, rocker arms within the crank case and pivoted to said removable case end, said rocker arms engaging said valve-operating rods, and cams on said gear ring for operating said rocker arms.

3. The combination with the crank shaft of an internal combustion motor; of a sprocket rotatable bodily with said shaft, a valve-operating ring surrounding said shaft eccentrically, combined bearing and driving rollers mounted at circumferentially spaced points on said ring and meshing with said sprocket, and a relatively fixed eccentric track on which said rollers travel to rotatably and non-frictionally support said ring, in addition to coacting with said sprocket in driving said ring.

In testimony whereof I have hereunto set my hand.

ANGEL AFANADOR.